United States Patent [19]
Pravednekow

[11] 3,774,930
[45] Nov. 27, 1973

[54] UTILITY DEVICE
[76] Inventor: Nicholas Pravednekow, Hicksville, N.Y. 11801
[22] Filed: Nov. 12, 1971
[21] Appl. No.: 198,189

[52] U.S. Cl. ............................... 280/47.24, 37/130
[51] Int. Cl. .............................................. B62b 1/12
[58] Field of Search .................... 280/47.24, 47.26; 294/59; 37/130

[56] References Cited
UNITED STATES PATENTS
| 1,015,969 | 1/1912 | McCray ...................... 280/47.26 X |
| 3,248,811 | 5/1966 | Pravednekow .................. 37/130 X |
| 861,308 | 7/1907 | McMann ..................... 280/47.26 X |
| 2,598,952 | 6/1952 | Weingart ..................... 280/47.24 X |
| 2,895,238 | 7/1959 | Long ......................... 280/47.26 X |
| 3,017,710 | 1/1962 | Carlson ...................... 280/47.26 X |

FOREIGN PATENTS OR APPLICATIONS
645,226   7/1962   Canada ........................... 280/47.24

Primary Examiner—Kenneth H. Betts
Assistant Examiner—John A. Pekar
Attorney—Edward Halle

[57] ABSTRACT

A utility device for moving loads having a load bearing platform including load shifting means in the form of a curved surface built into the top of the platform, in combination with platform fulcrum means for pivoting the surface including the load shifting means, together with fulcrum arm handle means to assist in pivoting the load bearing surface and in shifting the load borne on said surface.

8 Claims, 7 Drawing Figures

INVENTOR.
NICHOLAS PRAVEDNEKOW
BY Edward Halle
ATTORNEY.

UTILITY DEVICE

This invention relates to utility devices similar to scoops or wheelbarrows for moving loads. The main body portion of the device includes a curved upper platform having a fulcrum means and fulcrum arm handle means so that the curved platform and the fulcrum arm handle means will be positioned on opposite sides of the fulcrum means to permit the entire device to be used as a lever in lifting loads and in shifting the loads from an outer edge of the main body portion toward the portion of the main body associated with the fulcrum means, and thereby permit handling of heavy loads with relative ease. The fulcrum means may be in the form of a pair of wheels which may be demountable thereby shifting the fulcrum means of the device to the bottom of the body portion underneath the wheel mounts.

Thus, a device is provided which may be used on dry ground with the wheels, and which also may be used on slippery surfaces such as muddy surfaces or snow covered ground with the wheels demounted in much the same manner.

It is an object of this invention to provide such a device which may be used to lift and carry loads.

It is a further object of this invention to provide such a device which, in particular, will be suitable for moving utility cans such as garbage cans, and which will also be suitable for snow removal purposes.

Further objects and advantages will appear in the specification hereinbelow. The invention is illustrated in the accompanying drawings in which.

Figure 1:
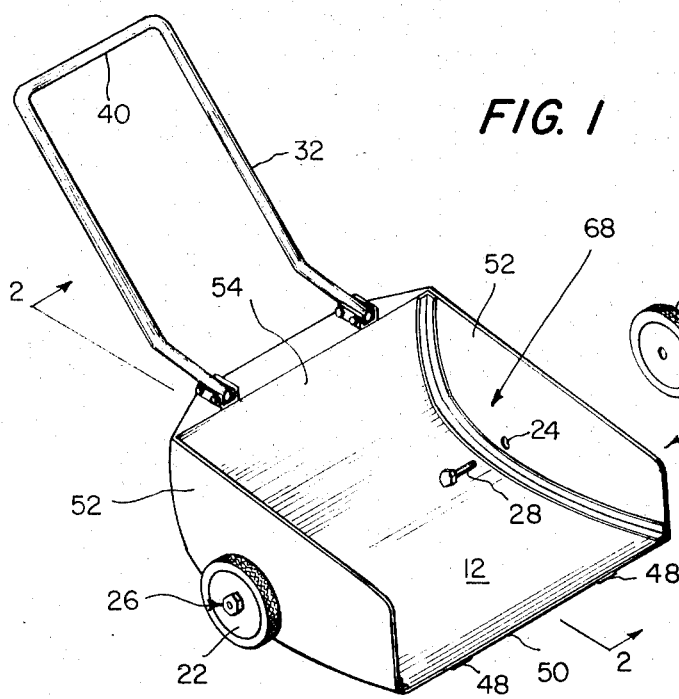
FIG. 1 is a perspective view with parts exploded.

FIGS. 4 through 7 inclusive are a series of end views showing the device in various positions for loading and unloading a utility can such as a garbage can.

Similar numerals refer to similar parts throughout the several views.

The main body portion 10 may be made of steel or other metal, or any material such as a plastic material which will be strong enough to withstand the use to which the utility device is put.

The body portion 10 has a bottom portion 12 including an upper surface 14 defining a cross sectional curve comprising a forward arm 16 and a rearward arm 18 on either side of a fulcrum area 10. The fulcrum area includes at least one demountable wheel 22. In the preferred form of the invention, there are a pair of demountable wheels 22 which may be mounted to the body portion 10 through shaft bearings 24 by means of shaft means 26 comprising bolt means 28 and nut fastening means 30. The body portion is provided with handle means 32 which form an extension of the arm means 18 so that the handle means 32 are associated with the fulcrum area 20.

Figure 2:
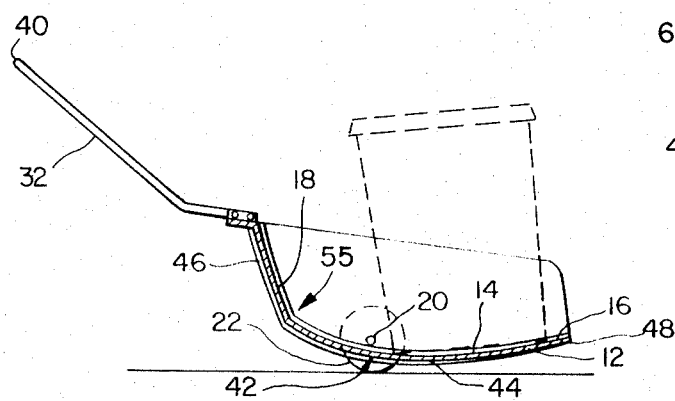
FIG. 2 is a sectional view along the lines 2—2 in FIG. 1 with parts in phantom.
Figure 4:
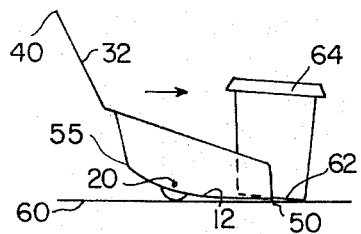
Figure 5:
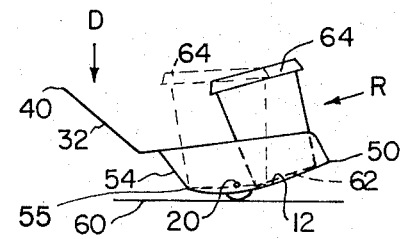
Figures 6, 7:
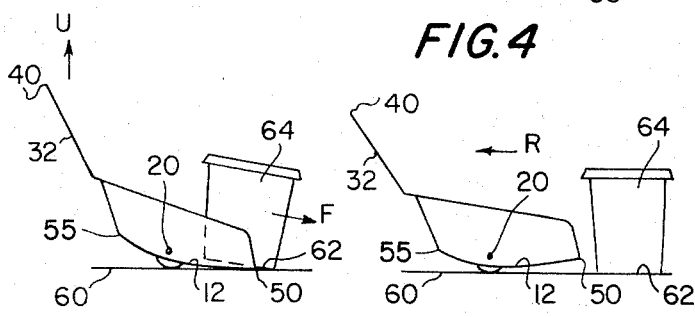

Thus, viewing FIG. 2 of the drawings, there is shown a fulcrum area 20 having arm means 16 as a lever arm extending to the right of the figure, and arm means 18 and handle means 32 extending as a lever arm to the left portion of the figure, both arms 16 and 18 plus handle means 32 being associated with the fulcrum means 20 so that an operator, by grasping the end 40 of handle means 32, can rotate or rock the entire device around the fulcrum area 20 as shown in FIGS. 4 through 7 of the drawings.

A feature of the invention is the provision of a fulcrum area means 20 which provides for rotation on the axis formed by the shaft means 26 as well as a fulcrum area means 42 which is located along the curve of the bottom 44 of the device and along which the device can be rocked when the wheels 22 are demounted. Thus, when the wheels 22 are mounted, the fulcrum area is defined by the axis of the shaft means 26 and when the wheels are demounted, the fulcrum area is defined by the curved portion 42 of the bottom 44 generally beneath the shaft bearings 24. In any case, the action of the device during operation is centered around a fulcrum area either 20 or 42, depending on whether the wheels 22 are mounted or demounted.

Skid or runner means 46 are provided to strengthen the body portion of the device, and also to permit easier operation when the wheels 22 are demounted. The skid means such as runners 46 will act in much the same manner as sleigh runners over a snowy type surface.

The fronts 48 of the runners 46 may be tapered so that the device is provided with a straight thin leading edge 50. The device is also provided with sides 52 and a sharply upcurved portion 54 which may serve as a backstop means.

The device may be operated as shown in FIGS. 4 through 7 of the drawings. An operator grasps the handlebar 40 of the handle means 32 and rolls the device forward in the direction of the arrow shown in FIG. 4, guiding the leading edge 50 along the level of floor 60 so that leading edge 50 will glide between the bottom 62 of an item such as a garbage can 64 and the floor 60. After leading edge 50 has glided a sufficient distance forward underneath can 64 to insure that can 64 will be lifted by platform 12, the operator bears down on handlebars 40 in the direction of arrow D in FIG. 5. This rotates the entire device on fulcrum area 20 and provides that the curve on upper part of platform 12 assumes a slope position. Force of gravity will then move can 64 along the upper surface of platform 12 in the direction of arrow R until it assumes the position of the can depicted in dotted lines against the corner 55 formed by backstop 54. This movement can be assisted by a sharp forward push on handlebars 40. The device is now loaded with the can 64 which may then be transported to any desired place by rolling the device over the floor or other surface.

The device is unloaded when the operator raises handlebar 40 in the direction of arrow U (FIG. 6) as he pushes it forward in the direction of arrow F, with leading edge 50 lowered toward floor 60. When the operator, still grasping handlebars 40, reduces the speed of, or stops, the forward motion of the device, the can 64 will continue to move forward and slide off the front of leading edge 50. At this point the operator can move the entire device rearward in the direction of arrow R in FIG. 7 completely unloading the device.

It can be appreciated that the use of the device permits the operator various degrees of mechanical advantage in lifting and transporting loads, and the operator also has the advantage of the wheels of the device in transporting the loads. The mechanical advantage for lifting and unloading is provided by the lever arrangement of the components of the device around the fulcrum area 20. That portion of platform 12 between the fulcrum area and leading edge 50 serves as one arm of the lever arrangement, and that portion of platform 12 between fulcrum area 20 and trailing edge 56 of the device, together with the handle means 32, forms another arm of the lever system.

When the wheels 22 are demounted and the device is moved by sliding it over a surface such as snow, the fulcrum area means 20 formerly provided at the shaft positions 26 moves down to the bottom of the device and becomes fulcrum area 42. Since the device can be rocked over a snowy surface, the same lever effect obtained when the wheels are mounted can be obtained when the wheels are demounted. The device can then be moved over the snowy surface on the runners 46 in the same manner as a sleigh or sled is moved. The same operation of lifting and moving a utility can or the like, such as a garbage can 64, can be done with the wheels demounted. In addition, the device can be used for snow removal since the platform 12 and the sides 52 together with backstop 54 form a scoop means 68. Scoop means 68 can be utilized with the wheels mounted or demounted. For example, snow removal can be accomplished with the wheels demounted. Moving quantities of loose material such as grain or gravel can be accomplished by using the scoop means 68 with the wheels mounted.

Figure 3:
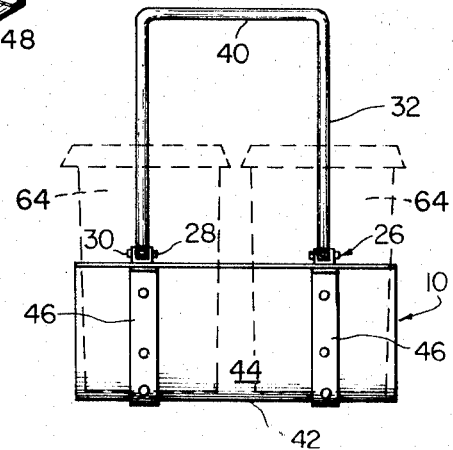
FIG. 3 is a rear elevation with the wheels demounted.

In FIG. 3 a pair of cans 64 are shown in side by side relationship in combination with the utility device. The device may be sized to carry and move two or more utility cans, or the like, such as garbage cans 64. A pair or more of such cans 64 in side by side relationship can be picked up and moved in the same manner of operation as described hereinabove.

While I have described my invention in its preferred form, there are other forms which it may take coming within the claims hereinbelow without departing from the spirit and scope of the invention, and I, therefore, desire to be protected for all such forms.

Wherefore I claim:

1. A utility device for moving loads, comprising a main body portion comprising a platform with load shifting means, shiftable fulcrum area means including at least one demountable roller means, and at least a portion of the bottom of the main body portion, forward fulcrum arm means adjacent said fulcrum area means, rearward fulcrum arm means adjacent said fulcrum area means, backstop means, and handle means extending rearwardly of said rearward fulcrum arm means; in which the load shifting means of the platform is comprised in an upper side of a continuously curved platform surface which forms at least part of each of said fulcrum arm means and the backstop means comprises a corner with said platform surface located within said rearward fulcrum arm means.

2. The utility device as claimed in claim 1, which further comprises a leading edge, said curve of said platform extending outwardly in forward and rearward directions from, and upwardly with relation to, said shiftable fulcrum area means to provide slope with relation to said forward and rearward fulcrum arm means.

3. The utility device as claimed in claim 2, in which the demountable roller means is a pair of demountable wheels mounted on shaft means and in which the fulcrum area means shifts from said shaft means when the wheels are mounted, to a fulcrum area means at the bottom of the main body portion when the wheels are demounted.

4. The utility device as claimed in claim 3, in which the main body portion has a lower surface curved to correspond generally with the curved upper surface of said load shifting platform surface.

5. The utility device as claimed in claim 2 which further comprises skid means on the lower surface portion thereof.

6. The utility device as claimed in claim 5 in combination with at least one associated utility container adapted to be accommodated on the load shifting platform of the utility device.

7. The combination as claimed in claim 6, in which the utility container is a garbage can adapted to slide in forward and rearward directions along the load shifting platform when the utility device is moved and rotated at the shiftable fulcrum area means by operating the handle means thereof.

8. The combination as claimed in claim 7 comprising a plurality of garbage cans adapted to fit in side by side relationship on said platform.

* * * * *